Patented Feb. 17, 1925.

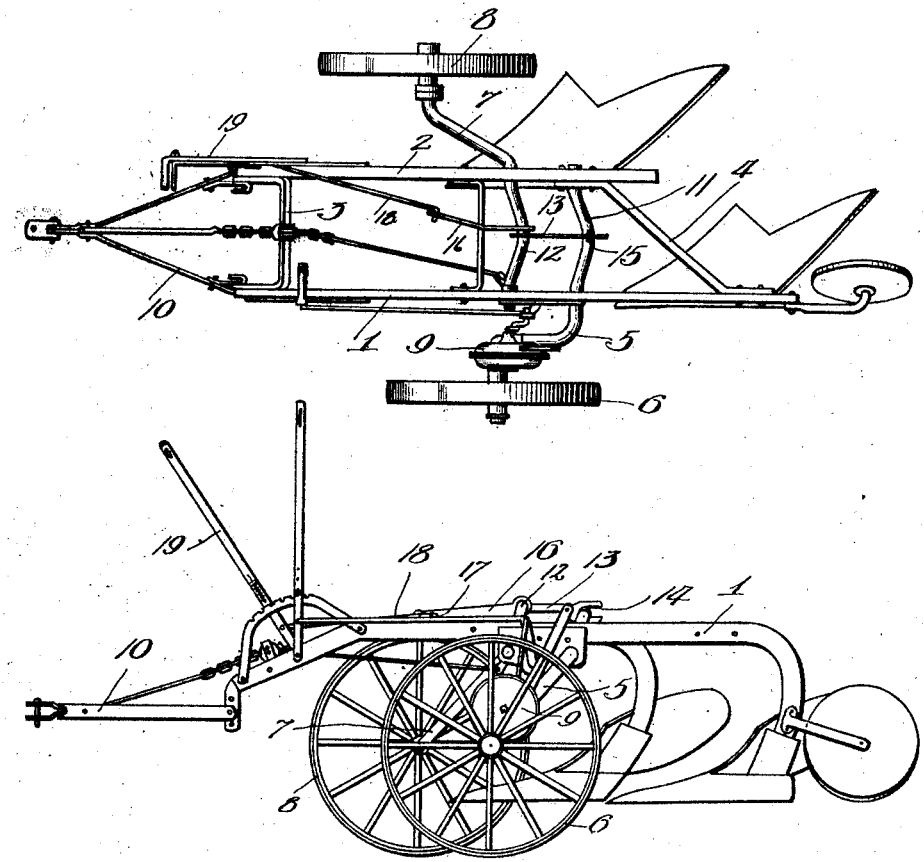

1,526,874

UNITED STATES PATENT OFFICE.

JOHN P. SEAHOLM, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

PLOW.

Application filed February 13, 1922. Serial No. 536,219.

*To all whom it may concern:*

Be it known that I, JOHN P. SEAHOLM, a citizen of the United States, residing at 1138 14th St., Moline, county of Rock Island, State of Illinois, have invented certain new and useful Improvements in Plows, of which the following is a specification.

The invention relates to plows.

It relates particularly to plows of the frameless type in which crank axles are rotatably connected to the plow beams so that they may be swung relative to the beams to raise and lower the plows.

It is usual, in constructions of this kind, to provide connections between the crank axles so that the movement of one crank axle is transmitted to the other under certain conditions. It is also usual to provide means for adjusting one or both of the crank axles. In both cases, it has heretofore been necessary to attach a crank to the axles to accomplish these results. This involves the addition of a number of parts and the provision of means for rigidly attaching the crank to the axle. The present invention has been devised to accomplish these results without the necessity for attaching a separate crank to each of the crank axles.

The general object of the invention is to provide a simplified plow construction.

A more specific object is to provide a construction in which the crank axles are shaped so that they can be connected together to transmit motion of one to the other without requiring the addition of separate cranks.

Other objects of the invention will appear from the specifications and drawings.

An embodiment of the invention is shown in the drawings in which,

Figure 1 is a plan view of the plow.

Figure 2 is a side elevation of the plow.

The plow includes two parallel plow beams 1 and 2 connected by a front cross brace 3 and a rear cross brace 4. Journaled to the plow beams is the land wheel crank axle 5 carrying the land wheel 6 and the furrow crank axle 7 carrying the furrow wheel 8. The plow is also provided with a powerlift mechanism 9 and a suitable draft device 10.

In order to transmit the movement of the land wheel crank axle to the furrow wheel crank axle when the land wheel crank axle is swung in a counter-clockwise direction to raise the plows, the land wheel crank axle is provided with a bend 11 and the furrow wheel crank axle with a bend 12. These two bent portions are connected by a link 13 such link being connected to the furrow wheel crank axle by being provided with a hole of suitable size and by being slipped on to the axle as the plow is assembled. The link is connected to the land wheel crank axle by means of a slot 14 shown in Figure 2. Small projections 15 comprising set screws, cotter pins or swelled portions on the axle are provided to keep the link 13 from getting out of position. It will be clear by referring to Figure 2 that any movement of the crank axle 5 in a counter-clockwise direction will tend to move the furrow wheel axle in the same direction whereas movement of the land wheel crank axle in a clockwise direction will not move the furrow wheel axle, but in practice the furrow wheel axle will follow the land wheel axle since the weight of the plows will swing it in a clockwise direction when the land wheel crank axle is lowered in the same direction.

The means for adjusting the furrow wheel axle 7 is also connected to the bend 12 in that axle, such means comprising a link 16 having a slot 17 in which is connected a link 18 fastened to an adjusting lever 19. Movement of the lever 19 will cause a reciprocatory movement of link 16 which will rotate the furrow wheel axle 7. The movement is a positive one when the lever 19 is moved to the left as viewed in Figure 2 but when the lever is moved to the right, the link 18 simply slides in the slot 17 and permits the furrow wheel axle to move, such movement being caused by the weight of the plows.

By means of this construction, movement of one axle is transmitted to the other and provision is made for the adjustment of one of the axles without requiring the addition of separate cranks which must be fixed to the crank axles. This eliminates a number of parts and simplifies and cheapens the construction, and at the same time makes it more durable and sturdy.

It is to be understood that the structure shown is for purposes of illustration and that variations may be made in it without departing from the substance of the invention as defined in the appended claims.

I claim:

1. A frameless plow having plow beams carrying plow bodies for turning soil, a land wheel crank axle pivoted to the beams and carrying a land wheel, furrow wheel crank axle pivoted to the beams and carrying a furrow wheel, powerlift mechanism carried by the land wheel crank axle and operated by travel of the land wheel to swing the land wheel crank axle to raise and lower the plow, said crank axles having bent up portions between the plow beams, and means connecting the bent-up portions to transmit the swinging movement of the land wheel axle to the furrow wheel axle when the land wheel axle is swung to raise the plow, said connecting means permitting the furrow wheel crank axle to move relatively to the land wheel crank axle in the opposite direction to permit adjustment of the furrow wheel crank axle.

2. A frameless plow having plow beams carrying plow bodies for turning soil, crank axles pivoted to the beams, ground wheels journalled on the crank axles, means for swinging one of the crank axles relative to the beam to raise and lower the plow, said crank axles having bent up portions between the beams, means connecting the bent-up portions to transmit the swinging movement of one crank axle to the other, said connecting means being loosely connected to one crank axle so as to permit relative adjustment of the two axles, and means connected to the bent up portion of the second crank axle for adjusting it to vary the height of one of the sides of the plow.

3. A frameless plow having plow beams carrying plow bodies for turning soil, a land wheel crank axle pivoted to the beams, a furrow wheel crank axle pivoted to the beams, a land and a furrow wheel journalled respectively on said axles, a powerlift mechanism carried by the land wheel crank axle and operated by travel of the land wheel to swing the crank axle to raise and lower the plow, said crank axles having bent up portions between their ends, a link having a hole in one end for the reception of the bent up portion of one crank axle, and a slot in the other end for the reception of the bent up portion of the other crank axle, and adjusting means connected to the bent up portion of the furrow wheel crank axle.

In testimony whereof, I affix my signature.

JOHN P. SEAHOLM.